US012746871B2

(12) United States Patent
Severn

(10) Patent No.: US 12,746,871 B2
(45) Date of Patent: Sep. 29, 2026

(54) REFLECTING OPTIC ASSEMBLY

(71) Applicant: Muth Mirror Systems, LLC, Sheboygan, WI (US)

(72) Inventor: Timothy Severn, Sheboygan, WI (US)

(73) Assignee: MUTH COMPANY, LLC, Sheboygan, WI (US)

( * ) Notice: Subject to any disclaimer, the term of this patent is extended or adjusted under 35 U.S.C. 154(b) by 25 days.

(21) Appl. No.: 18/688,722

(22) PCT Filed: Jul. 11, 2023

(86) PCT No.: PCT/US2023/069936

§ 371 (c)(1),
(2) Date: Mar. 1, 2024

(87) PCT Pub. No.: WO2024/015767

PCT Pub. Date: Jan. 18, 2024

(65) Prior Publication Data

US 2025/0145081 A1 May 8, 2025

Related U.S. Application Data

(60) Provisional application No. 63/368,179, filed on Jul. 12, 2022.

(51) Int. Cl.
*B60Q 1/26* (2006.01)
*B60R 1/06* (2006.01)
*B60R 1/12* (2006.01)

(52) U.S. Cl.
CPC .......... *B60Q 1/2665* (2013.01); *B60R 1/1207* (2013.01); *B60R 1/06* (2013.01)

(58) Field of Classification Search
None
See application file for complete search history.

(56) References Cited

U.S. PATENT DOCUMENTS 6,092,918 A * 7/2000 Ikegami ................ F21S 41/435 362/543
6,109,772 A * 8/2000 Futami .................... F21V 5/045 362/336

(Continued)

FOREIGN PATENT DOCUMENTS

CN 110646983 A 1/2020
WO WO-2021039827 A1 * 3/2021 .............. F21S 45/10

OTHER PUBLICATIONS

Search Report and Written Opinion for PCT Application No. PCT/US23/69936 mailed on Dec. 19, 2023.

*Primary Examiner* — Derek S. Chapel
(74) *Attorney, Agent, or Firm* — Godfrey & Kahn S.C.; James A. Joyce

(57) ABSTRACT

A reflecting optic assembly for use on a vehicle is provided that includes a housing having a housing aperture, one or more light sources positioned inside the housing and coupled with a circuit board to selectively emit light, and a reflector mounted in the housing for collecting and distributing light from the one or more light sources through the housing aperture into an oblong shaped light spot pattern. The reflector including a doubly concave first side reflecting surface that is concave as it extends along both a first length and a first width, a doubly concave second side reflecting surface that is concave as it extends along both a second length and a second width, and a transitional center reflecting surface extending between the doubly concave first side reflecting surface and the doubly concave second side reflecting surface.

20 Claims, 14 Drawing Sheets

(56) References Cited

U.S. PATENT DOCUMENTS

| | | | | |
|---|---|---|---|---|
| 9,327,640 | B2 * | 5/2016 | Harrington, Jr. | F21S 41/148 |
| 9,696,008 | B2 * | 7/2017 | Hunter | F21V 7/28 |
| 2004/0145910 | A1 * | 7/2004 | Lisowski | F21S 41/147 362/519 |
| 2005/0185409 | A1 * | 8/2005 | Mayer | F21V 7/06 362/350 |
| 2006/0083005 | A1 * | 4/2006 | Sokolov | G02B 19/0023 362/341 |
| 2009/0296417 | A1 | 12/2009 | Luo et al. | |
| 2012/0294037 | A1 | 11/2012 | Holman et al. | |
| 2017/0114980 | A1 * | 4/2017 | Madril | F21V 7/24 |
| 2020/0292144 | A1 | 9/2020 | Giraud | |
| 2021/0247048 | A1 * | 8/2021 | Perlin | G02B 19/0061 |

* cited by examiner

REFLECTING OPTIC ASSEMBLY

CROSS-REFERENCE TO RELATED APPLICATIONS

This application claims the benefit of and priority to U.S. Provisional Patent Application No. 63/368,179 filed on Jul. 12, 2022, the disclosure of which is incorporated herein by reference in its entirety for all purposes.

FIELD OF THE INVENTION

The reflecting optic assembly relates generally to the field of lighting, and more particularly to illumination of vehicular displays, mirrors, and spaces.

BACKGROUND

Vehicles have in recent years utilized exterior side rear-view mirrors as lighting platforms for such features as turn signals, puddle lights, and blind spot indicators. It can be desirable in at least some embodiments, that the shape of the light spot projected from these or other vehicular lights, such as interior lights, have a more advantageous shape, such as an oblong shape, etc., when illuminating parts of a vehicle, a space within a vehicle, or when creating an icon that is efficiently bright throughout a broad viewing angle in one direction and a narrow viewing angle in a second direction. It is also desirable to provide advantageous shapes by utilizing multi-contoured reflectors, among other things.

SUMMARY OF THE INVENTION

In at least some embodiments, disclosed is a reflecting optic assembly for use on a vehicle that includes a housing having a housing aperture; one or more light sources positioned inside the housing and coupled with a circuit board to selectively emit light; and a reflector having a front wall, a rear wall, a first side wall, and a second side wall, where the reflector is mounted in the housing for collecting and distributing light from the one or more light sources through the housing aperture into an oblong shaped light spot pattern, the reflector comprising: a doubly concave first side reflecting surface having a first length and a first width, wherein the first side reflecting surface is concave as it extends along both the first length and the first width: a doubly concave second side reflecting surface having a second length and a second width, wherein the second side reflecting surface is concave as it extends along both the second length and the second width; and a transitional center reflecting surface extending between the doubly concave first side reflecting surface and the doubly concave second side reflecting surface.

In at least some further embodiments, disclosed is a reflecting optic assembly for use on a vehicle that includes a housing having a housing aperture: a circuit board positioned inside the housing: a single light source secured to the circuit board and energizable to selectively emit light; and a reflector having a front wall, a rear wall, a first side wall, and a second side wall, where the reflector is mounted in the housing for collecting and distributing emitted light from the single light source through the housing aperture, the reflector comprising: a doubly concave first side reflecting surface having a first length and a first width, wherein the first side reflecting surface is concave as it extends along both the first length and the first width: a doubly concave second side reflecting surface having a second length and a second width, wherein the second side reflecting surface is concave as it extends along both the second length and the second width; and a transitional center reflecting surface extending between the doubly concave first side reflecting surface and the doubly concave second side reflecting surface.

In at least some yet further embodiments, disclosed is a reflecting optic assembly for use on a vehicle that includes: a housing: a diffuser: a circuit board: an LED light source mounted to the circuit board and positioned to selectively emit light: a first side reflecting surface comprising a doubly-concave curvature aligned to the LED and formed by revolving a refocusing profile about an axis between the LED and a virtual focal point: a second side reflecting surface comprising a second doubly-concave curvature aligned to the LED and formed by revolving a similar refocusing profile about an acutely angled axis to the first axis that lies along the line between the LED and a second virtual focal point; and a center reflecting surface that includes a concave-convex curvature that is convex in one direction and concave in the other direction, and is formed by revolving a similar refocusing profile about a third angularly opposed axis situated on a central plane between the plane of the first profile and the plane of the second profile thereby forming a transition surface between the first two reflective surfaces.

In at least still some further embodiments, disclosed is a reflecting optic assembly for use on a vehicle that includes: a housing: a diffuser: a circuit board: an LED light source mounted to the circuit board and positioned to selectively emit light: a first side reflecting surface comprising a doubly-concave curvature aligned to the LED and formed by revolving a refocusing profile about an axis between the LED and a virtual focal point: a second side reflecting surface comprising a second doubly-concave curvature aligned to the LED and formed by revolving a similar refocusing profile about an acutely angled axis to the first axis that lies along the line between the LED and a second virtual focal point; and a center reflecting surface that includes a concave-concave curvature that is concave in one direction and concave in the other direction, and is formed by revolving a similar refocusing profile about a third angularly opposed axis situated on a central plane between the plane of the first profile and the plane of the second profile thereby forming a transition surface between the first two reflective surfaces.

Other embodiments, aspects, and features of the invention will be understood and appreciated upon a full reading of the detailed description and the claims that follow.

BRIEF DESCRIPTION OF THE DRAWINGS

Exemplary embodiments of the reflecting optic assembly are disclosed with reference to the accompanying drawings. The assembly is not limited in application to the construction and configuration details or the arrangement of the components illustrated in the drawings. The reflecting optic assembly is capable of other embodiments or of being practiced or carried out in other various ways.

DETAILED DESCRIPTION

Figure 1:
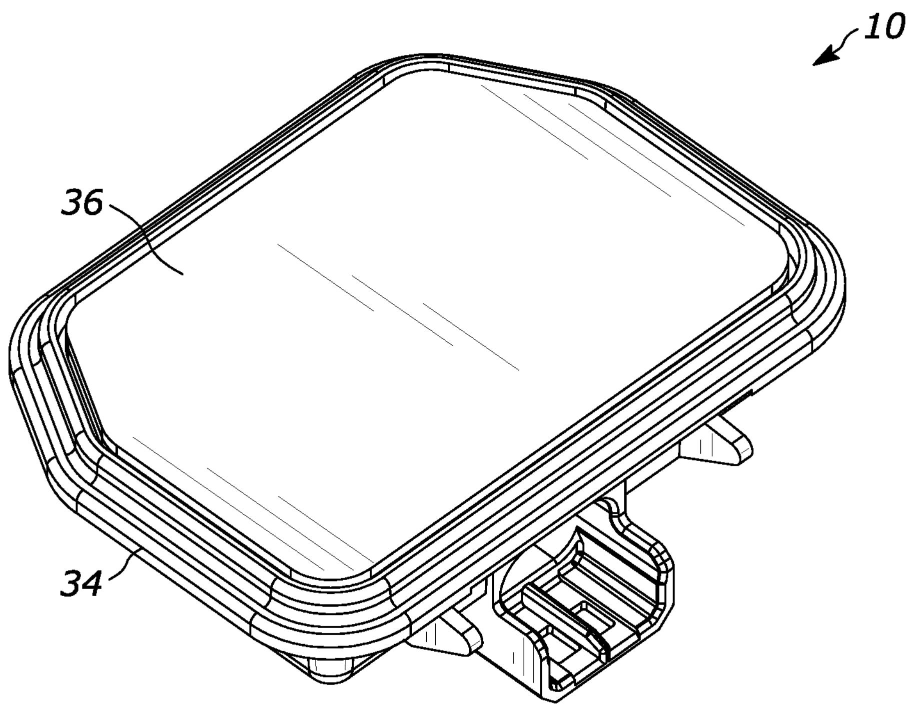
FIG. 1 is top front perspective view of an exemplary reflecting optic assembly.
Figure 2:
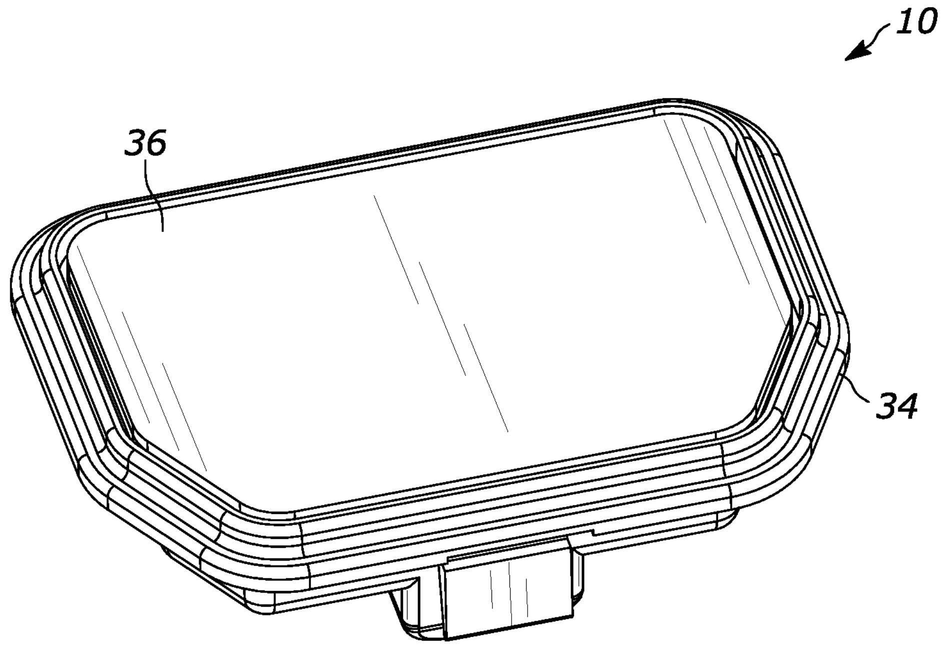
FIG. 2 is top rear perspective view of the reflecting optic assembly of FIG. 1.
Figure 3:
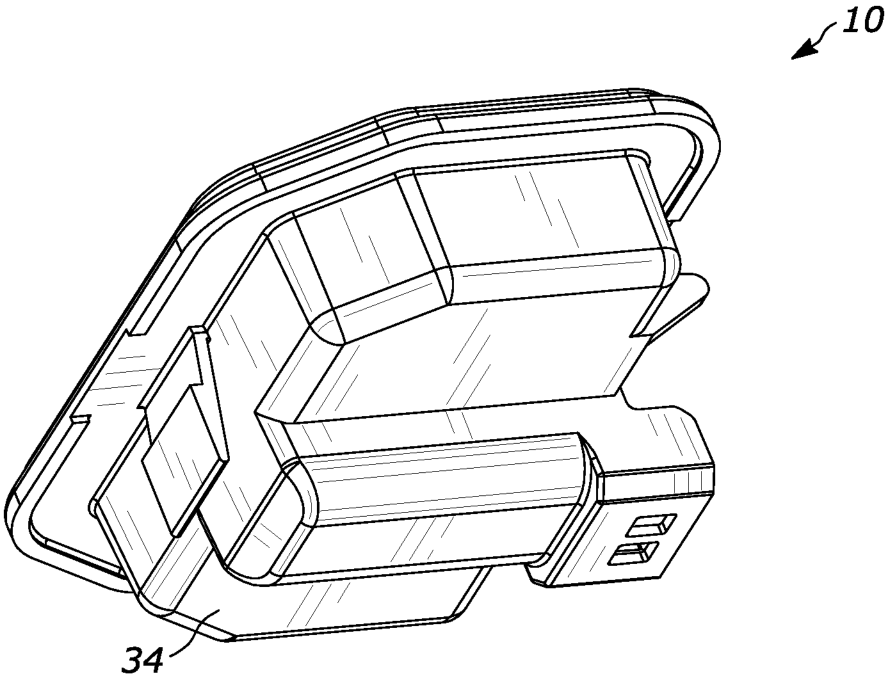
FIG. 3 is a bottom rear perspective view of the reflecting optic assembly of FIG. 1.
Figure 4:
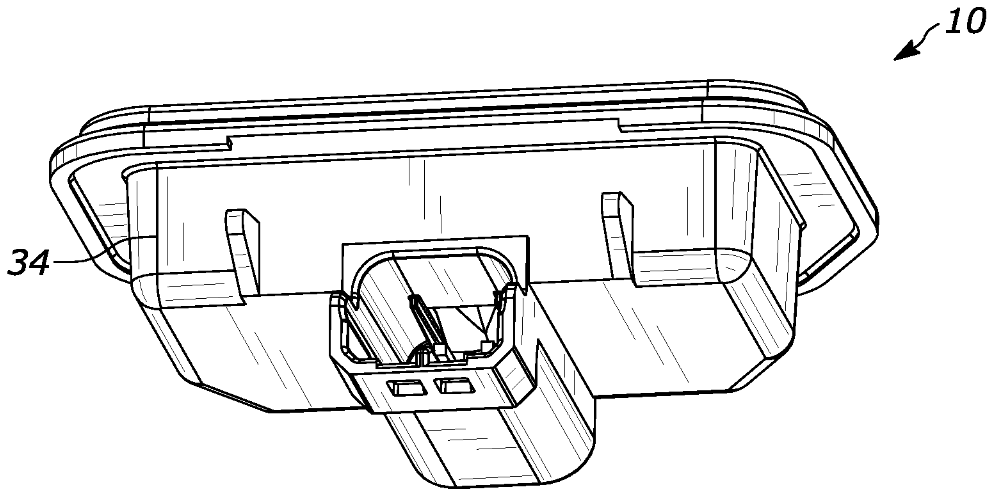
FIG. 4 is a bottom front perspective view of the reflecting optic assembly of FIG. 1.
Figure 5:
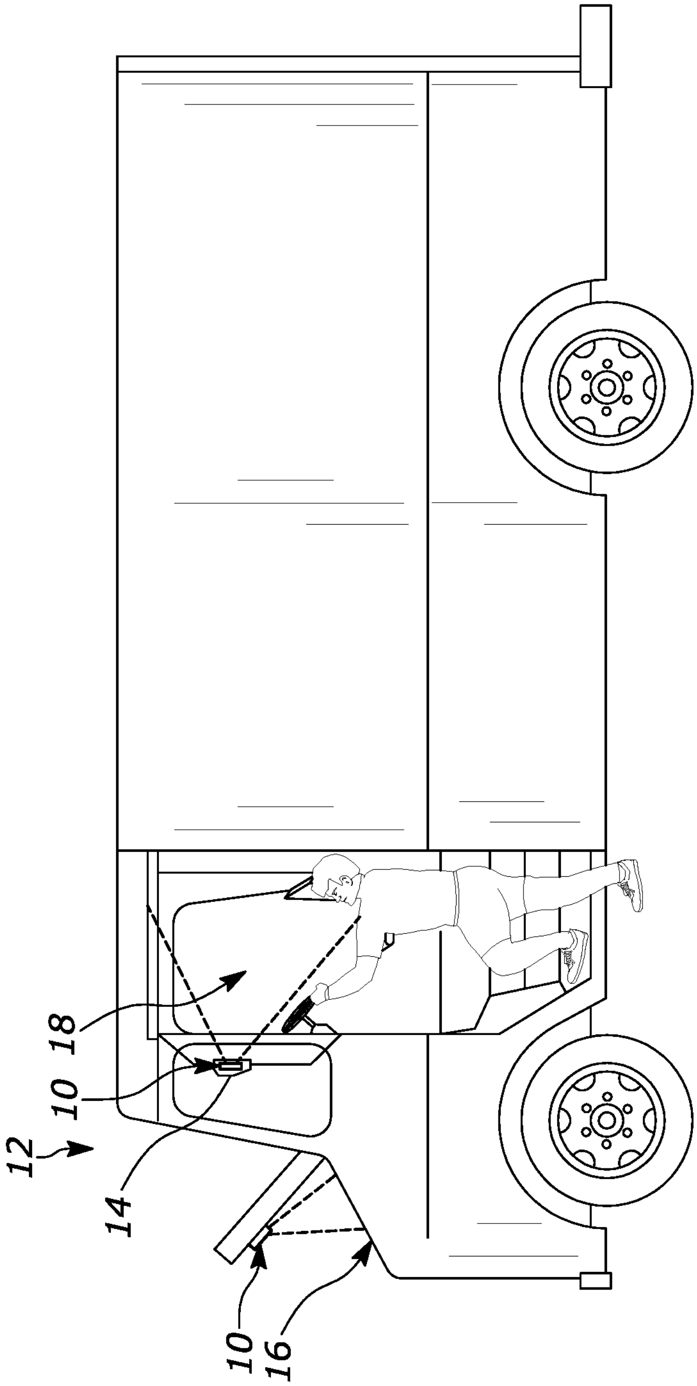
FIG. 5 is a side view of an exemplary vehicle incorporating various placements of the reflecting optic assembly of FIG. 1.

Referring to FIGS. 1-4, an exemplary reflecting optic assembly 10 is shown in various views. Referring additionally to FIG. 5, the reflecting optic assembly 10 is configured to be secured to a vehicle 12, such as in an exterior mirror assembly 14 on the vehicle 12. In at least some embodiments, the reflecting optic assembly 10 can be mounted behind mirror glass of the exterior mirror assembly 14, noting that the methods for mounting a typical optic assembly behind mirror glass are known, as described in U.S. Pat. No. 6,045,243, the disclosure of which is incorporated in its entirety by reference herein. In other embodiments, the reflecting optic assembly 10 can be situated elsewhere, such as in the engine compartment 16, trunk of a vehicle, or in other locations where oblong-shaped illumination is desired. The reflecting optic assembly 10 is configured to project an oblong shaped light spot pattern and can be positioned horizontally, vertically, or at any other necessary mounting position as desired, such as to illuminate an icon in a mirror assembly, such as a blind spot warning, or to provide basic illumination for a desired space or viewing angle, such as a trunk or interior portion 18 of a vehicle 12.

Figure 6:
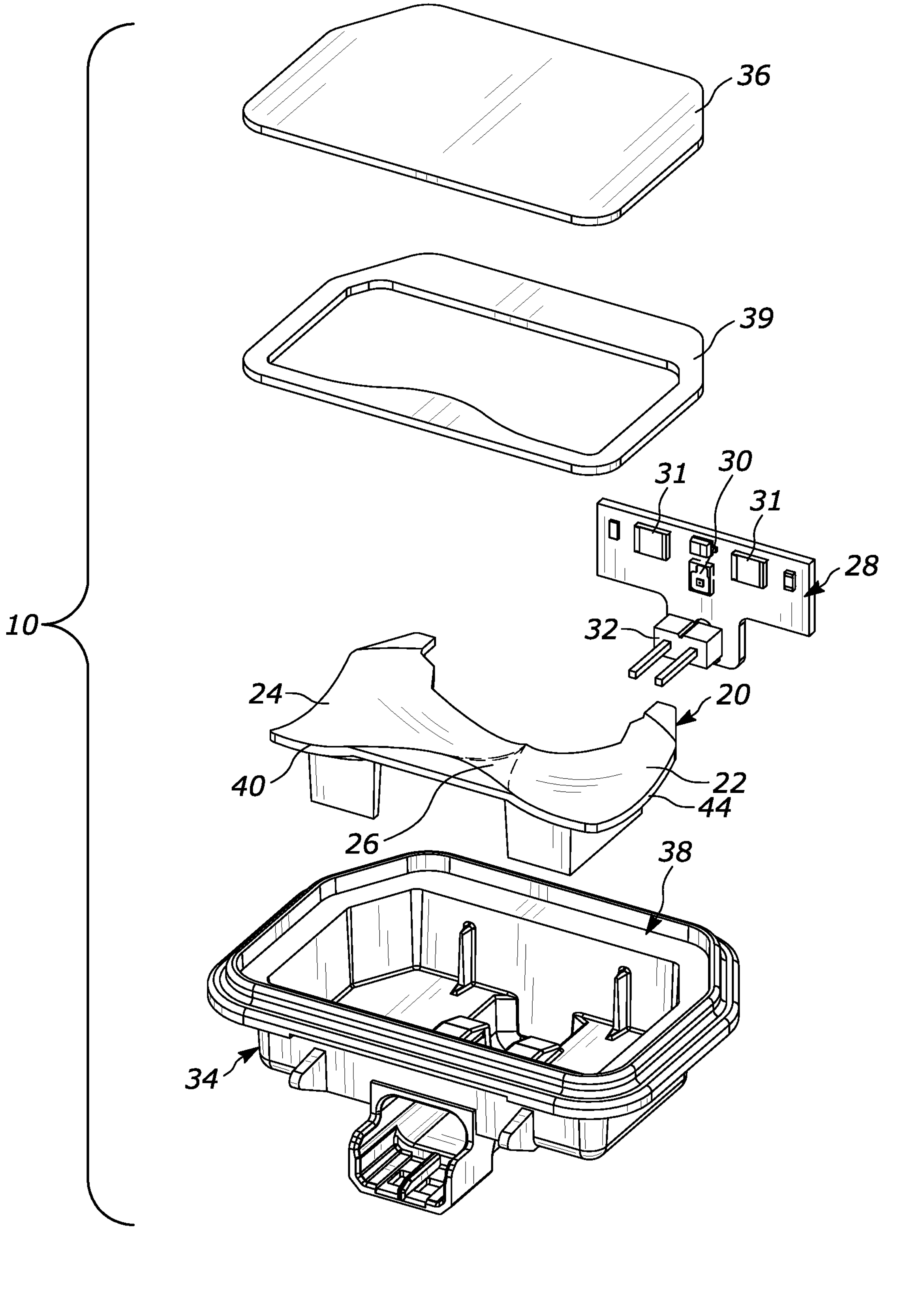
FIG. 6 is a top front exploded view of the reflecting optic assembly of FIG. 1.
Figure 7:
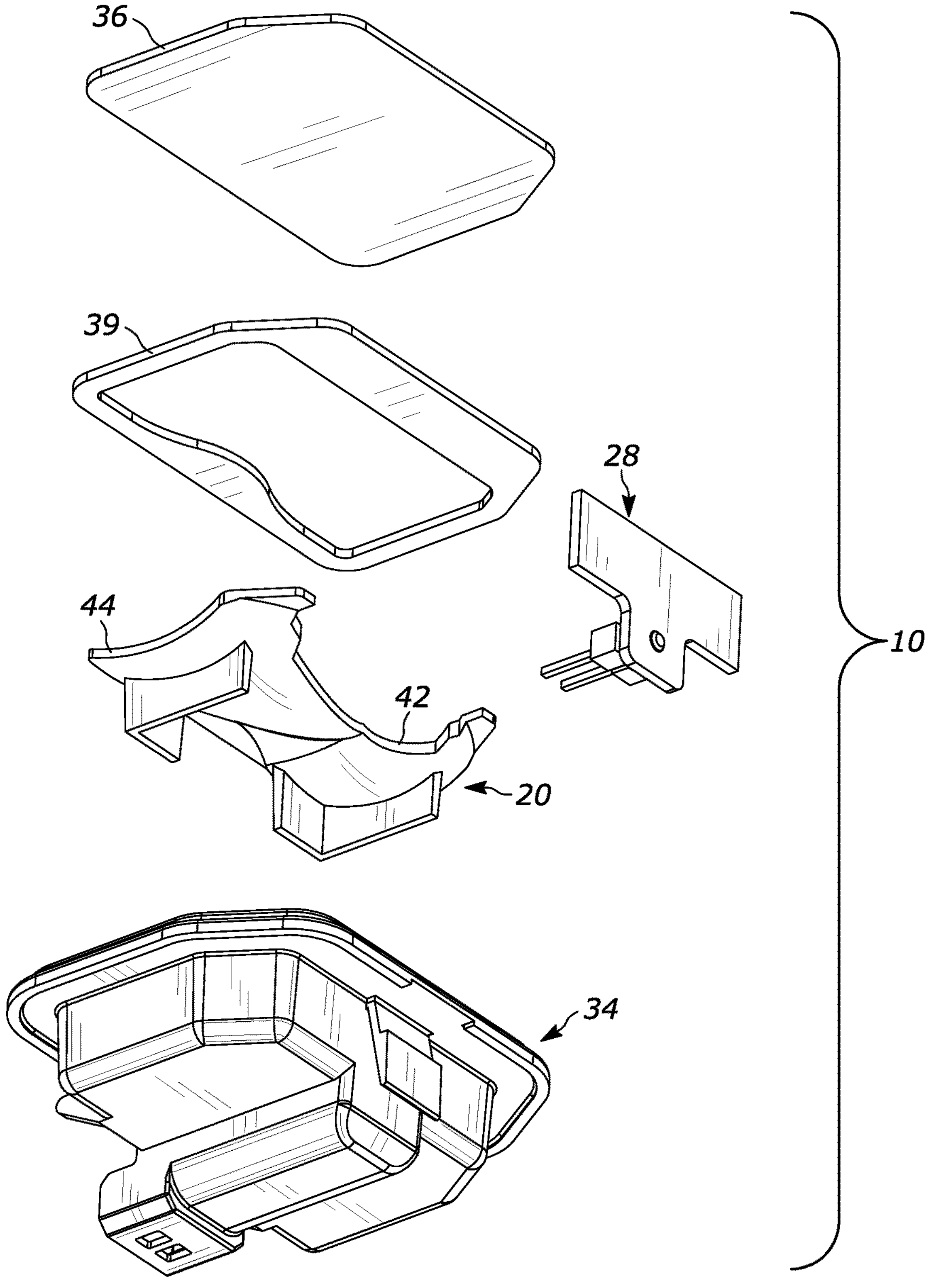
FIG. 7 is a bottom rear exploded view of the reflecting optic assembly of FIG. 1.
Figure 8:
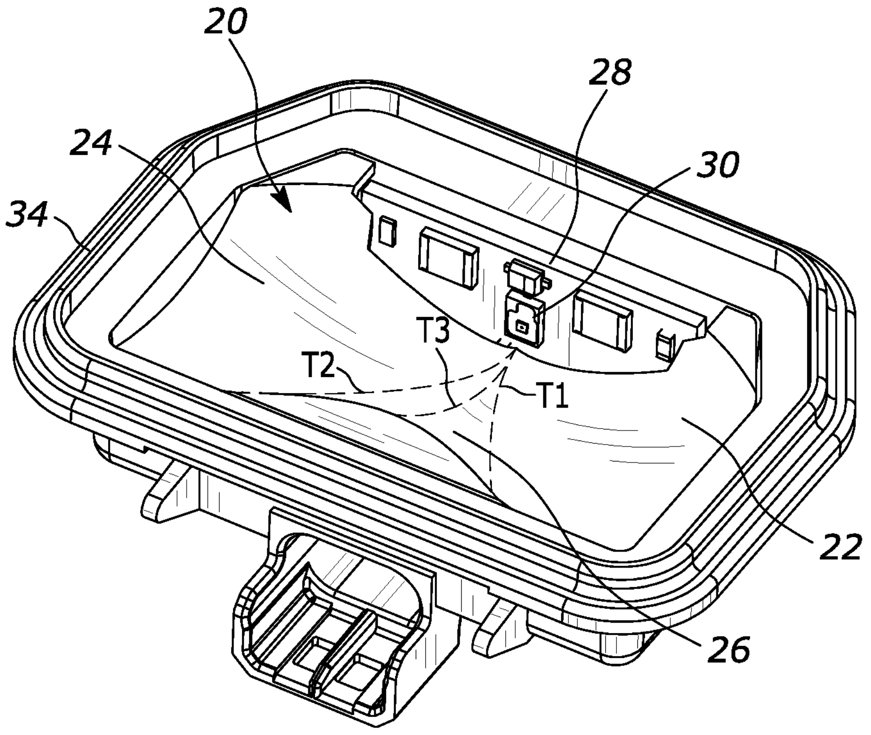
FIG. 8 is a top front perspective view of the reflecting optic assembly of FIG. 1, with the cover lens removed to illustrate exemplary positioning of the reflector and light source in the housing.
Figure 9:
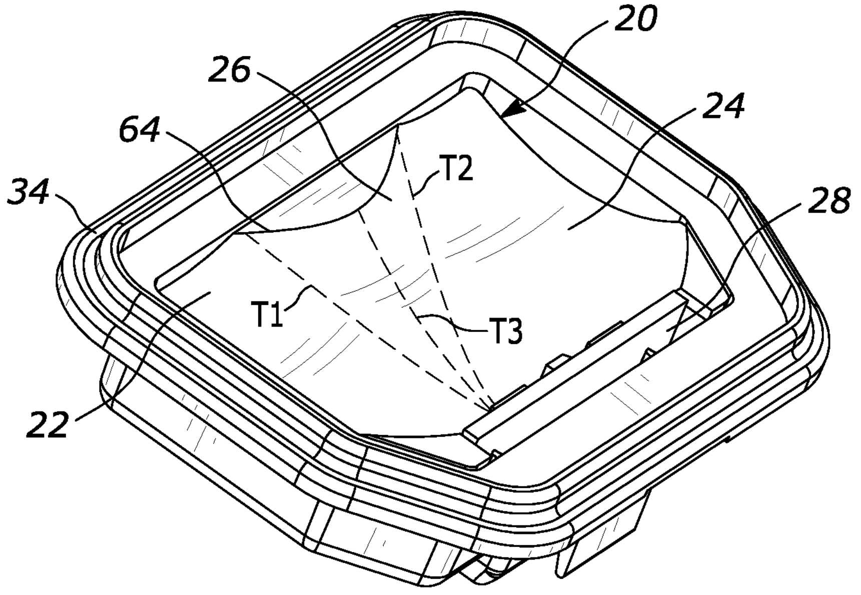
FIG. 9 is a top rear perspective view of the reflecting optic assembly shown in FIG. 8.
Figure 10:
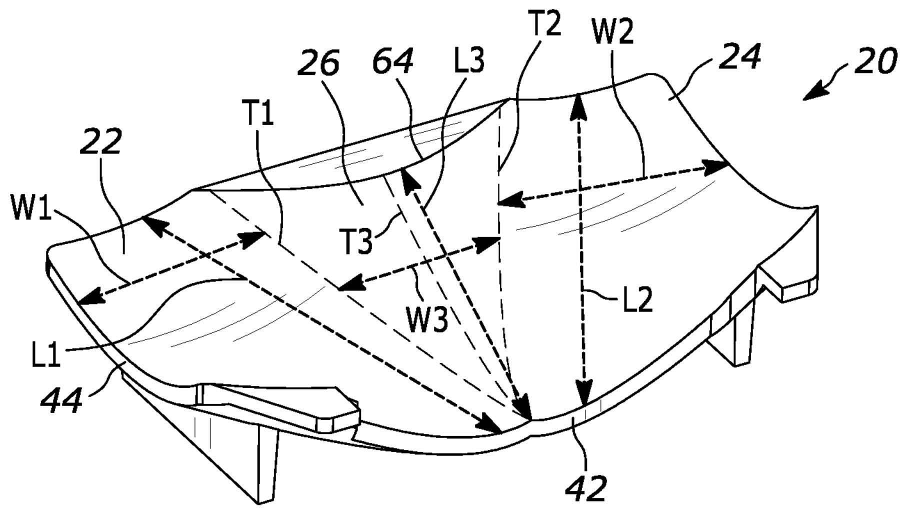
FIG. 10 is a rear perspective view of the reflector of FIG. 1.
Figure 11:
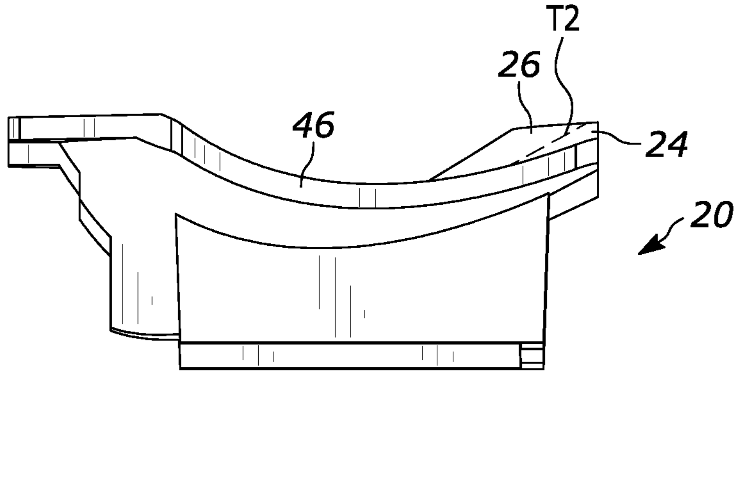
FIG. 11 is a side view of the reflector of FIG. 10.
Figure 12:
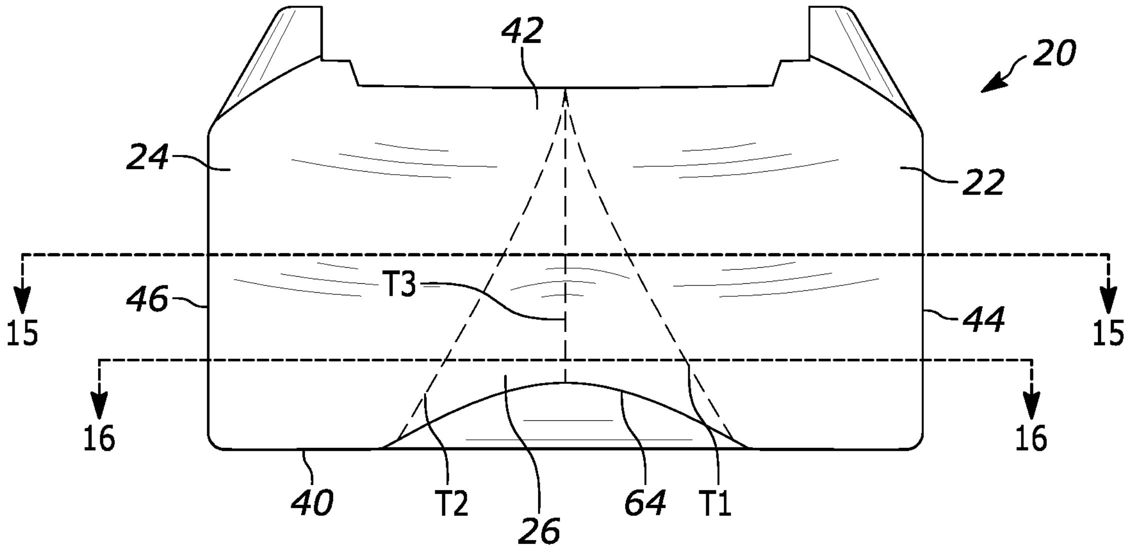
FIG. 12 is a top view of the reflector of FIG. 10.
Figure 13:
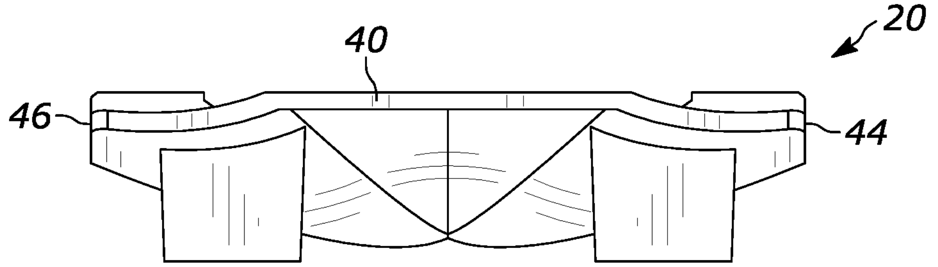
FIG. 13 is a front view of the reflector of FIG. 10.
Figure 14:
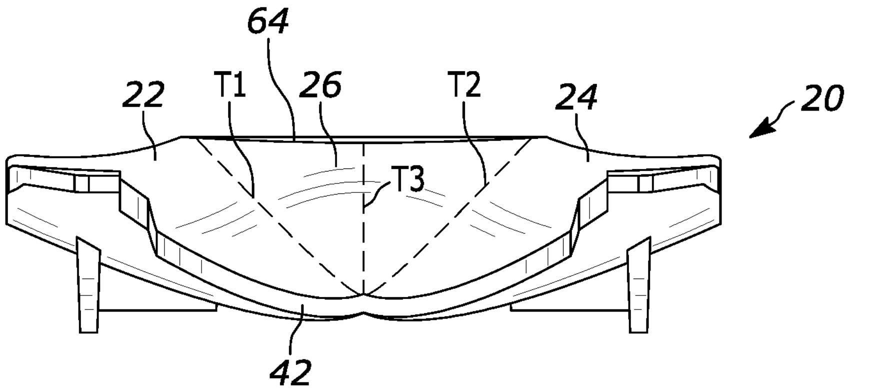
FIG. 14 is a rear view of the reflector of FIG. 10.
Figure 15:
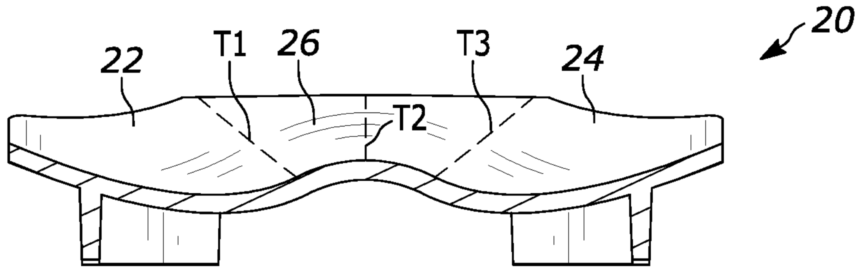
FIG. 15 is a cross-sectional view of the reflector taken along lines 15-15 of FIG. 12.
Figure 16:
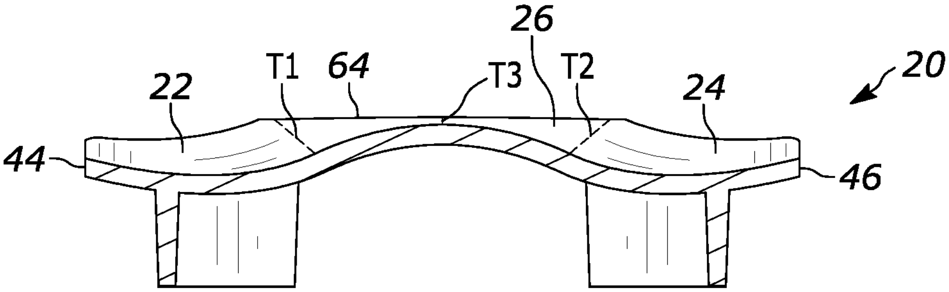
FIG. 16 is another cross-sectional view of the reflector taken along lines 16-16 of FIG. 12.

Referring to FIGS. 6 and 7, exemplary top front and bottom rear exploded views are provided. In at least some embodiments the reflecting optic assembly 10 includes a reflector 20 for collecting and distributing emitted light, wherein the reflector 20 can have multiple (e.g., two, etc.) side reflecting surfaces, such as a first side reflecting surface 22 and second side reflecting surface 24, as well as a transitional center reflecting surface 26 extending therebetween, which can be convex or concave, as discussed in detail below. The first and second side reflecting surfaces 22, 24 and center reflecting surface 26 are configured to receive and direct light emitted from one or more light sources, which can be mounted in various manners. It shall be understood that directing light includes reflecting light rays off a surface to change its direction. The reflecting optic assembly 10 further includes a circuit board 28 for facilitating energization and mounting of the one or more light sources, such as LED 30 (it shall be understood that LED 30 can be substituted with other types of suitable light sources). In at least some embodiments, the reflecting optic assembly includes only a single LED 30 to provide illumination therefrom, while in other embodiments, additional LEDs' 30 can be utilized. The circuit board 28 can further include a connector portion 32 for coupling with a vehicle's electrical system and various other known circuit components (e.g., resistors 31, etc.) typically used to control or power lights sources such as LEDS. The reflector 20 and circuit board 28 are situated within a housing 34 that in at least some embodiments, is sized and shaped to position the LED 30 desirably relative to the reflector 20 and provide a secure and protected enclosure. In at least some embodiments, the circuit board powering the LED 30 can be situated elsewhere (e.g., outside the housing, etc.) and communicatively coupled to the LED 30 for energization, with the LED 30 mounted inside the housing 34. The housing 34 can vary in shape and size as desired to accommodate the reflector 20 and to allow for mounting in various locations in or on a vehicle, for example see FIGS. 8 and 9 depicting exemplary positioning of the reflector 20 and LED 30 in the housing 34. In at least some embodiments, the LED 30 is positioned above a rear wall 42 of the reflector 20. Further in at least some embodiments, the LED 30 is positioned directly between the first side reflecting surface 22 and the second side reflecting surface 24 (i.e., centered), wherein the LED 30 directs a first portion of emitted light to the first side reflecting surface 22, a second portion of emitted light to the center reflecting surface 26, and a third portion of emitted light to the second side reflecting surface 24.

As seen in FIGS. 1-4, a diffuser 36 can be provided to cover a housing aperture 38 in the housing 34. The diffuser 36 can be sealed to the housing 34 using various know methods, such as an adhesive gasket 39, a weld bead, or other means. The diffuser 36 can take many forms to provide different effects, and can include embossing, etching, or printing thereon for illumination by the light sources (e.g., to project an image or logo, etc.). Various types of known diffuser materials can be used that include for example, light scattering pigment, surface finish treatment SPI D3, etc.

Referring again to FIGS. 8 and 9, the reflecting optic assembly 10 is shown in rear and front perspective views with the diffuser 36 omitted to illustrate exemplary positioning of the reflector 20 and LED 30 in the housing 34. As noted, the reflecting optic assembly 10 can vary in size and shape, although in at least some embodiments, its overall dimensions are approximately 31 mm W×42 mm L×13 mm D.

Referring now to FIGS. 10-16, various views of the reflector 20 are provided to illustrate the various exemplary contours of the first and second side reflecting surfaces 22, 24 and the center reflecting surface 26. In at least some embodiments, the first and second side reflecting surfaces 22, 24 are symmetrical (relative to the center reflecting surface 26), having equal respective widths W1 and W2 and equal respective lengths L1 and L2, and are concave along both their respective widths and their respective lengths (i.e., doubly-concave), while in other embodiments, other contours can be provided. It shall be understood that the overall widths W1, W2 can increase and decrease as they extend along their respective lengths L1, L2, as seen in the FIGS. This doubly concave surface can direct light from a light source to project a substantially circular light spot. The center reflecting surface 26 is in at least some embodiments, convex along its width W3 as it extends between the first and second side reflecting surfaces 22, 24 on either side and concave along its length L3 (i.e., convex-concave), dipping downwards and back up as it reaches the edge 64.

Figure 17:
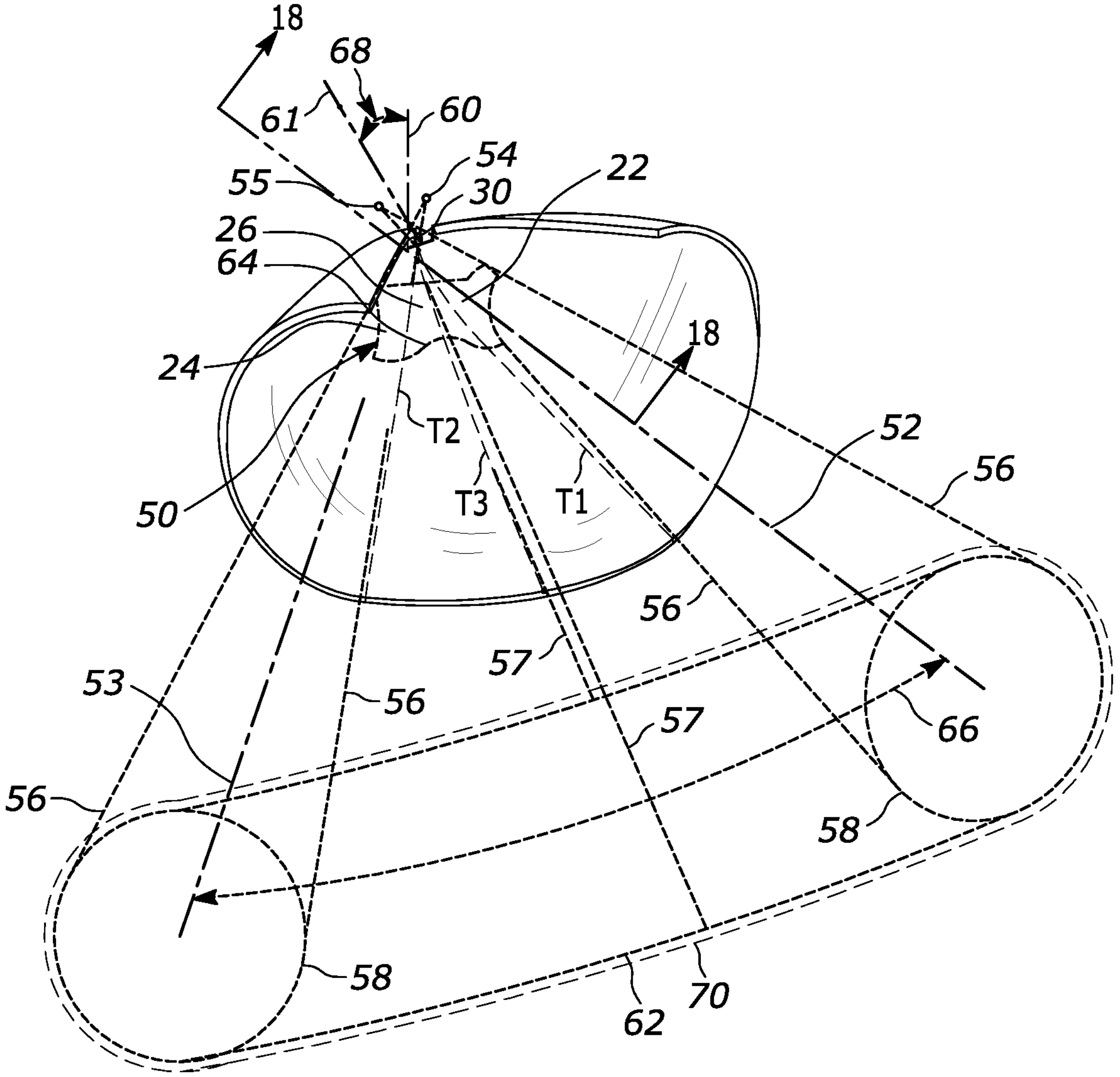
FIG. 17 is a representative perspective view of the reflector of FIG. 10 with its portions extended for illustrative purposes.

The center reflecting surface 26 can taper in width as it extends from a front wall 40 towards the rear wall 42, where the degree of tapering can be varied to direct light as desired. In at least some embodiments, the width W3 of the center reflecting surface 26 tapers to zero at the rear wall 42. As the center reflecting surface 26 is positioned between the first and second side reflecting surfaces 22, 24, and the contours of the reflector 20 can be smooth, the precise point of transition therebetween can vary, although for clarity, the transition therebetween is approximately at a center of the change in curvature, which is identified in the FIGS. as dashed lines T1 and T2. In addition, the center reflecting surface 26 has a center of curvature at dashed line T3 extending along the length L3 of the center reflecting surface 26. Light emitted from the LED 30 is directed along the various reflective surface contours of the reflector 20 and projected through the diffuser 36. In at least some embodiments, the total projected light forms a composite elongated oblong shaped light spot pattern 70 (FIG. 17). The reflector 20 further includes a first side wall 44 and a second side wall 46, wherein the first side reflecting surface 22 extends between the first side wall 44 and the center reflecting surface 26, and the second side reflecting surface 24 extends between the second side wall 46 and the center reflecting surface 26. It can be seen in the FIGS. that the widths W1 and W2 can vary along the respective lengths L1 and L2.

Figure 18:
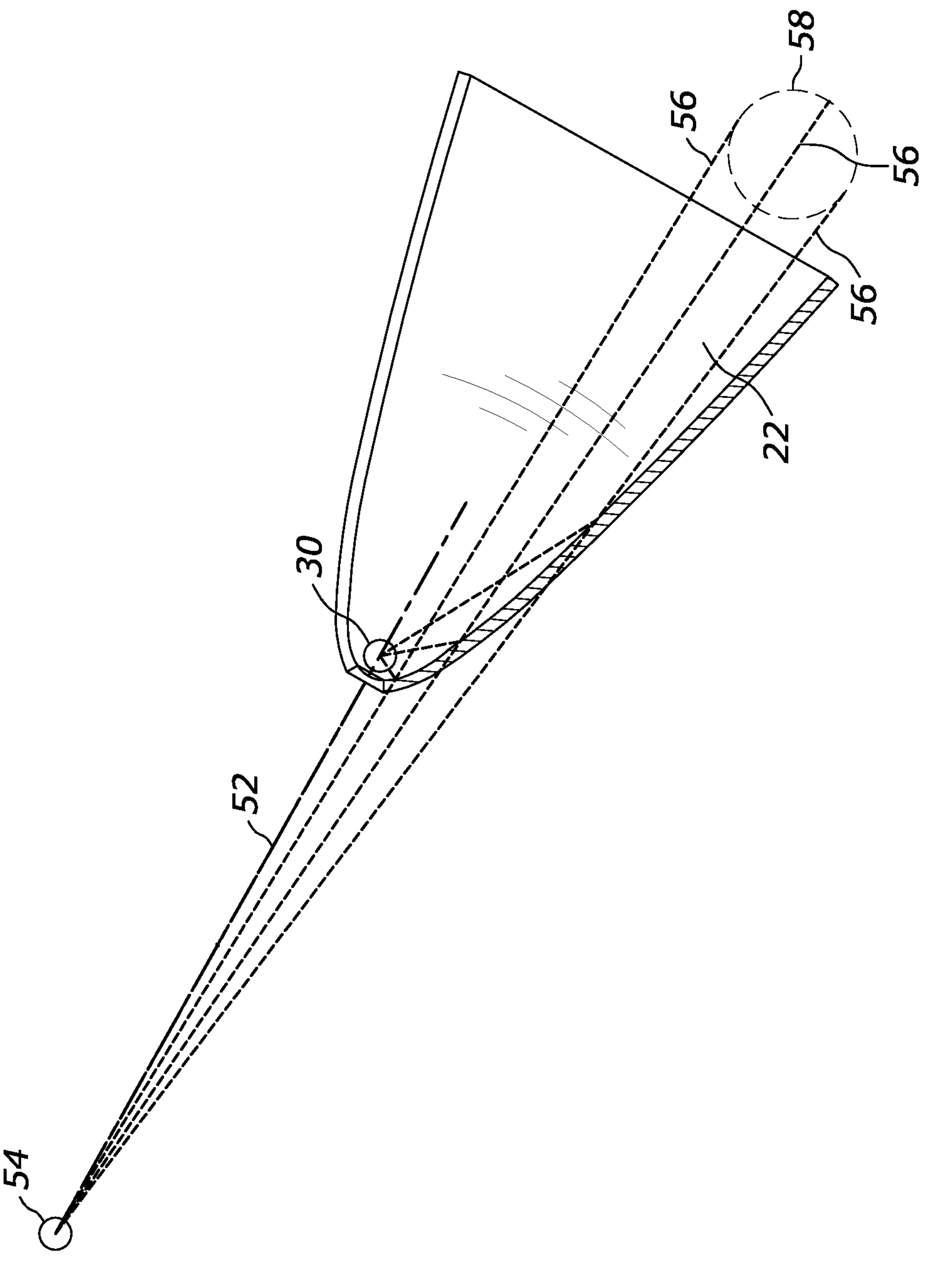
FIG. 18 is representative partial cross-sectional view taken along lines 18-18 of FIG. 17 for illustrative purposes.
Figure 19:
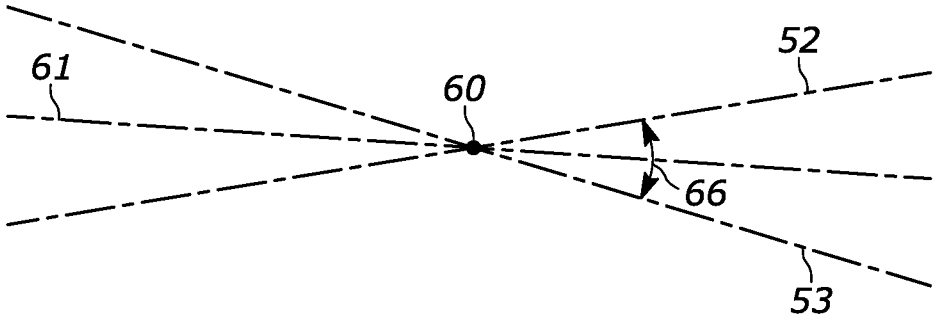
FIG. 19 is an exemplary top view of a plane extending between a first axis of revolution and a second axis of revolution of the reflector in FIG. 1.

The formation of the composite elongated oblong shaped light spot pattern 70 created by the reflector 20 is more easily described using a representative view of the reflector 20 with its portions extended for illustrative purposes, as seen in FIG. 17. The actual extents of the reflector 20 are shown in dashed line 50. As seen in FIG. 17, the first and second side reflecting surfaces 22, 24 are each shown doubly concave and formed about a respective axis of revolution (e.g., a first axis of revolution 52 and a second axis of revolution 53) and respective virtual focal points (e.g., virtual focal point 54 and virtual focal point 55) formed by a profile revolution. The shape of the first and second side reflecting surfaces 22, 24 serves to direct portions 56 of the LED's light into generally circular-shaped spot patterns 58 at the extents of the light projection on each respective side (see also partial cross-sectional view FIG. 18). The doubly concave first and second side reflecting surfaces 22, 24 are joined therebetween by the convex-concave center reflecting surface 26 formed by a profile revolution about an axis 60 at an angle 68 (extending between axis 60 and an axis 61), where angle 68 is generally between about 70 degrees and about 120 degrees, although other smaller or larger angles can be utilized. Axis 61 represents a rearward extension of a bisector extending between the first axis of revolution 52 and the second axis of revolution 53, with axis 60 extending upward from a point of bisection between the first axis of revolution 52 and the second axis of revolution 53 (see FIG. 19). The portion of the LED's light directed along the center reflecting surface 26 (indicated in part by dashed lines 57) form a generally arc-shaped light spot pattern 62, which joins with the light portions 56 reflected from the first and second side reflecting surfaces 22, 24. In at least some embodiments, angle 66 extending between the respective axes of revolution 52 for each doubly concave side reflecting surface 22, 24 is typically an acute angle between 5 and 70 degrees, although larger or small angles can be utilized. In combination with the diffuser 36, the three spot patterns 58, 58, 62 (shown as superimposed dashed lines) create the bright, arced, and generally uniform composite elongated oblong shaped light spot pattern 70. For clarity, the dashed lines showing light portions 56 and 57 are intended to roughly illustrative the direction and placement of some of the light and not to represent all of the light rays being directed or emitted. In addition, it should be noted that in at least some embodiments, although most of the light emitted from the LED 30 is directed by the reflector surfaces, some of the emitted directly emitted light can join the reflected light to form the composite elongated oblong shaped light spot pattern 70. The tooling for such a reflector 20 can be polished easily because the extents of the center reflecting surface shown by dashed lines T1 and T2 along the reflector 20 flow smoothly between the center reflecting surface 26 and the doubly concave first and second side reflecting surfaces 22, 24.

Figure 20:
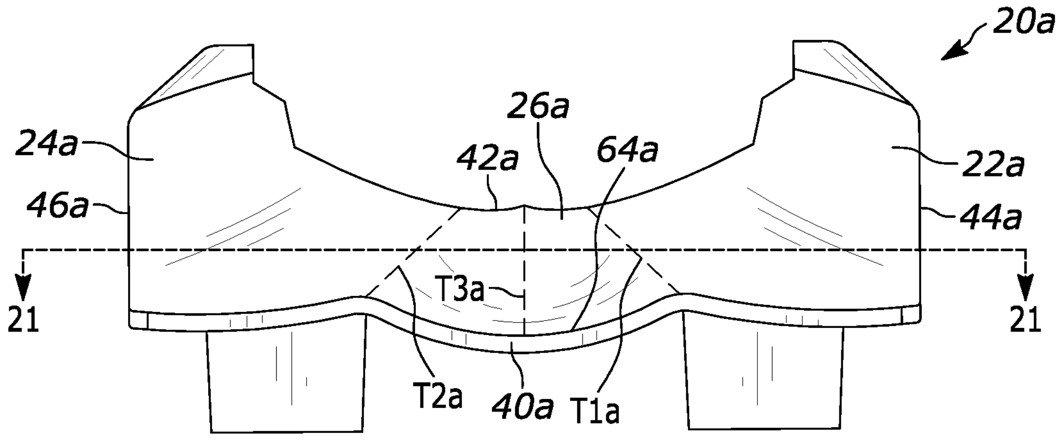
FIG. 20 is a top front perspective of another embodiment of an exemplary reflector for use with the reflecting optic assembly of FIG. 1.
Figure 21:
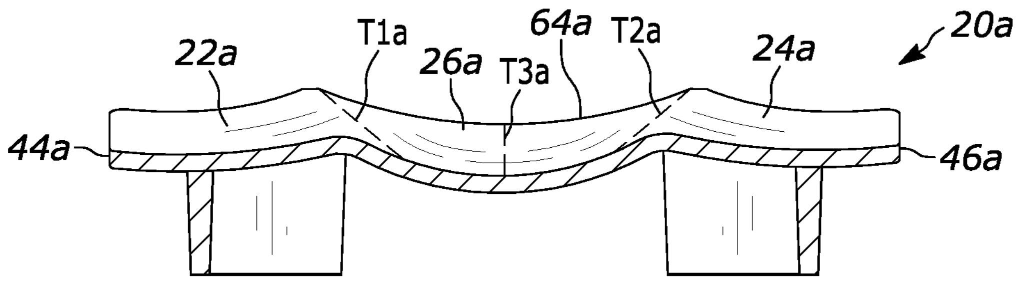
FIG. 21 is a cross-sectional rear view of the reflector taken along lines 21-21 of FIG. 20.
Figure 22:
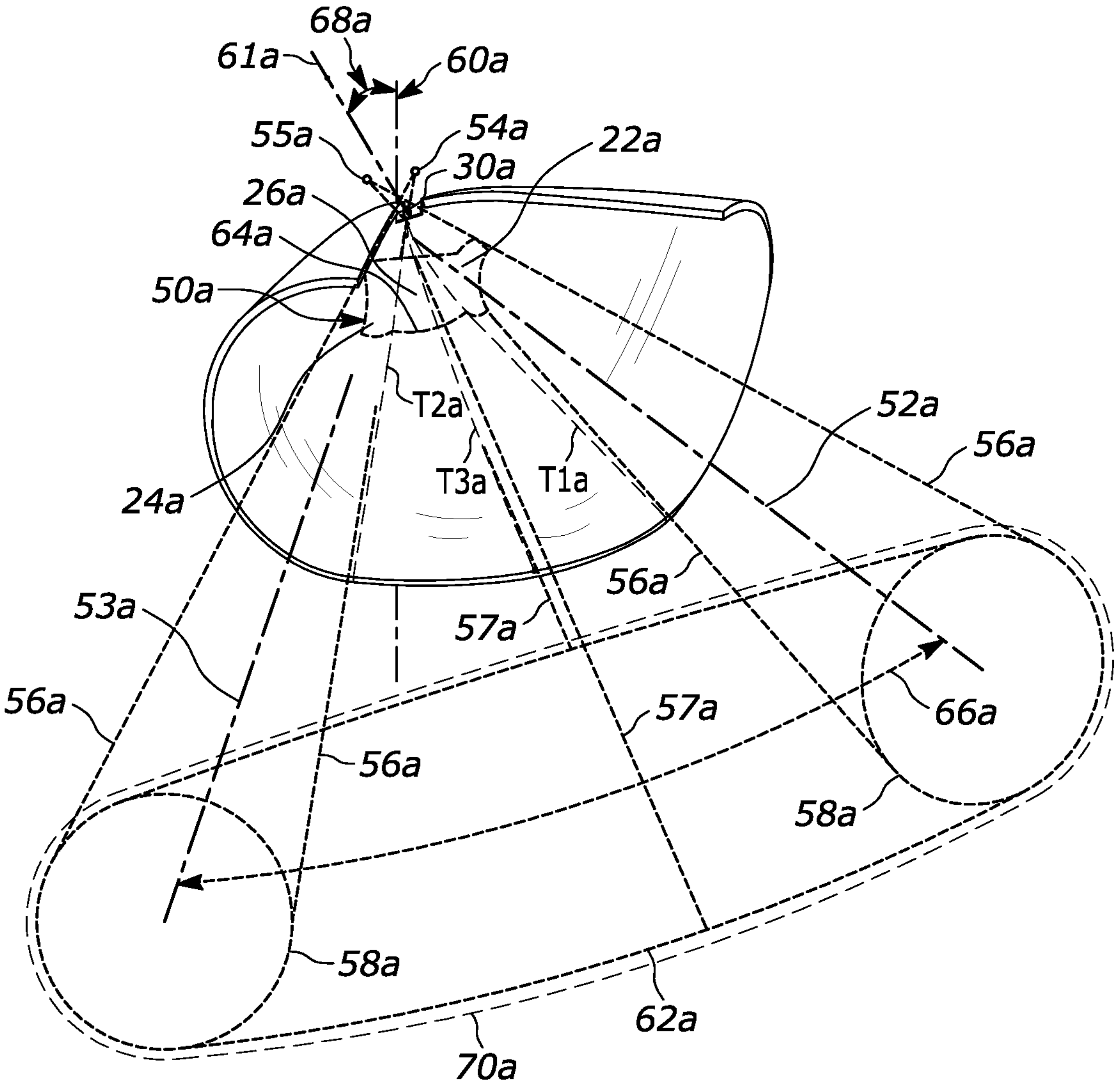
FIG. 22 is a representative perspective view of the reflector of FIG. 20 with its portions extended for illustrative purposes.

The reflecting optic assembly 10 can utilize reflectors having other shapes. For example, referring to FIGS. 20 and 21, another embodiment of the reflector is shown in front perspective and cross-section views. This reflector, identified as reflector 20*a*, utilizes similar doubly concave first and second side reflecting surfaces 22*a*, 24*a*, but has a center reflecting surface 26*a* that is also concave-concave (doubly concave) along its width and length, rather than convex-concave, as seen in reflector 20. Use of the doubly concave center reflecting surface 26*a* provides a different shaped light spot pattern, as seen in FIG. 22. FIG. 22 provides an exemplary representative view of the reflector 20*a* with its portions extended for illustrative purposes (similar to above regarding FIG. 17) with the actual extents of the reflector 20*a* shown in dashed line 50*a*. As seen in FIG. 22, the reflector 20*a* includes the doubly concave first and second side reflective surfaces 22*a*. 24*a*, each formed with a respective axis of revolution 52*a*, and virtual focal points 54*a*, 55*a* formed by profile revolutions, to project portions 56*a* of the LED light into generally circular-shaped spot patterns 58*a* at the extents of the light projection and wherein the doubly concave side reflecting surface surfaces 22*a*, 24*a* are joined by the doubly concave center reflecting surface 26*a* that is concave-concave with the change in curvature at dashed lines T1*a* and T2*a*, and a center of curvature at dashed line T3*a*. The center reflecting surface 26*a* is formed by profile revolution about axis 60*a* at angle 68*a* (extending between axis 60*a* and an axis 61*a*) where angle 68*a* is generally between about 70 degrees and about 120 degrees, to provide a concave-concave contour (until it reaches a low point at the edge 64*a*) so as to project the portions of LED's light (indicated in part by dashed lines 57*a*) into a more elliptical shaped spot pattern 62*a* (rather than the arc-shaped spot pattern seen in FIG. 17), which joins with the light portions

Figure 23:
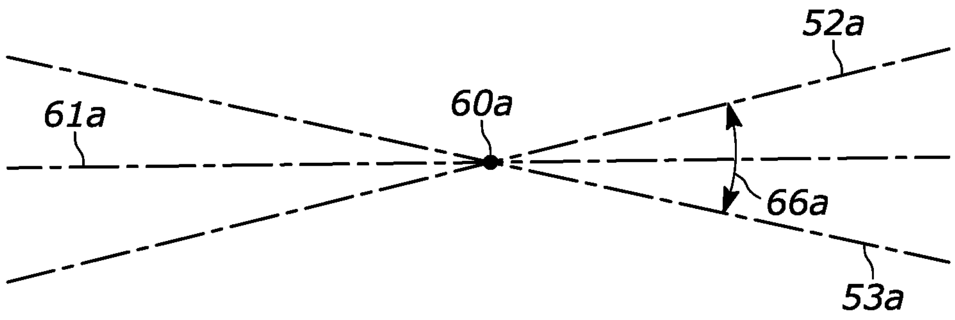
FIG. 23 is an exemplary top view of a plane extending between a first axis of revolution and a second axis of revolution of the reflector in FIG. 20.

56a reflected from the first and second side reflecting surfaces 22a, 24a. Axis 61a represents a rearward extension of a bisector extending between the first axis of revolution 52a and the second axis of revolution 53a, with axis 60a extending upward from a point of bisection between the first axis of revolution 52a and the second axis of revolution 53a (see FIG. 23). Using the diffuser 36, the three spot patterns 58a, 58a, 62a (shown as superimposed dashed lines) create the generally elliptical composite elongated oblong shaped light spot pattern 70a. Similar to reflector 20, reflector 20a includes a first side wall 44a and a second side wall 46a, wherein the first side reflecting surface 22a extends between the first side wall 44a and the center reflecting surface 26a, and the second side reflecting surface 24a extends between the second side wall 46a and the center reflecting surface 26a. The center reflecting surface 26a can also taper in width as it extends from a front wall 40a towards a rear wall 42a.

The aforementioned reflector designs provide for a desirable light distribution and can be used to overcome various deficiencies in existing lighting assemblies. For example, the outputted spot pattern can be well suited to illuminate interior vehicle spaces having multiple sub-spaces with different sizes and shapes, as well as positioned at different depths in the space, such as under the hood or inside a trunk space.

In at least some embodiments the reflecting optic assembly 10 can include a co-molding process instead of a welded assembly or an assembly bonded by gasketing. In at least some embodiments, the reflector can be made of polycarbonate material and the diffuser can be made of acrylic or PMMA, and the housing can be made of ABS plastic, although any of various other known materials can be utilized as well for various parts, including the reflector, diffuser, and housing. For exemplary purposes, the invention has been described for use with an LED light source 30, although it shall be understood that various other types of light sources can be utilized in addition to or in place of the LED light source.

Although the invention is shown and described in various embodiments, it is to be understood that it is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims. The term plurality shall be understood to include one or more.

What is claimed is:

1. A reflecting optic assembly for use on a vehicle comprising:

a housing having a housing aperture;

one or more light sources positioned inside the housing and coupled with a circuit board to selectively emit light; and a reflector having a front wall, a rear wall, a first side wall, and a second side wall, where the reflector is mounted in the housing for collecting and distributing the emitted light from the one or more light sources through the housing aperture into an oblong shaped light spot pattern, the reflector comprising:

a doubly concave first side reflecting surface having a first length and a first width, wherein the doubly concave first side reflecting surface is concave as it extends along both the first length and the first width;

a doubly concave second side reflecting surface having a second length and a second width, wherein the doubly concave second side reflecting surface is concave as it extends along both the second length and the second width; and a transitional center reflecting surface extending between the doubly concave first side reflecting surface and the doubly concave second side reflecting surface, with the center reflecting surface having a third width and a third length, wherein the center reflecting surface is convex as it extends along the third width and concave as it extends along the third length.

2. The reflecting optic assembly of claim 1, wherein the center reflecting surface tapers in width as it extends from the front wall towards the rear wall of the reflector.

3. The reflecting optic assembly of claim 2, wherein the doubly concave first side reflecting surface extends between the first side wall and the center reflecting surface, and the doubly concave second side reflecting surface extends between the second side wall and the center reflecting surface.

4. The reflecting optic assembly of claim 3, wherein the one or more light sources include a first light source positioned above the rear wall of the reflector.

5. The reflecting optic assembly of claim 3, wherein the one or more light sources include a first light source positioned between the doubly concave first side reflecting surface to direct a first portion of light onto the doubly concave first side reflecting surface and a second portion of light onto the center reflecting surface, and a third portion of light onto the doubly concave second side reflecting surface.

6. The reflecting optic assembly of claim 5, wherein the doubly concave first side reflecting surface is formed at least in part by revolution about a first axis of revolution extending over the doubly concave first side reflecting surface and forming a first virtual focus point situated behind the reflector.

7. The reflecting optic assembly of claim 6, wherein the doubly concave second side reflecting surface is formed at least in part by revolution about a second axis of revolution extending over the doubly concave second side reflecting surface and forming a second virtual focus point situated behind the reflector.

8. The reflecting optic assembly of claim 7, wherein, the first axis of revolution and the second axis of revolution have an acute first angle extending between them as they extend towards the front wall of the reflector.

9. The reflecting optic assembly of claim 8, wherein the acute first angle is between 1 and 70 degrees.

10. The reflecting optic assembly of claim 5, wherein a first portion of the light emitted from the first light source is directed by the doubly concave first side reflecting surface to project a first substantially circular-shaped spot pattern outward from the reflector.

11. The reflecting optic assembly of claim 10, wherein a second portion of the light emitted from the first light source is directed by the doubly concave second side reflecting surface to project a second substantially circular-shaped spot pattern outward from the reflector.

12. The reflecting optic assembly of claim 11, wherein a third portion of the light emitted from the first light source is directed by the center reflecting surface to project a substantially arc-shaped spot pattern outward from the reflector.

13. The reflecting optic assembly of claim 2, wherein the center reflecting surface tapers to a width of zero at the rear wall of the reflector providing abutment of the doubly concave first side reflecting surface and the doubly concave second side reflecting surface.

14. The reflecting optic assembly of claim 13, further comprising a diffuser positioned over the housing aperture.

15. The reflecting optic assembly of claim 2, wherein relative to the center reflecting surface, the doubly concave first side reflecting surface of the reflector is symmetrical with the doubly concave second side reflecting surface.

16. The reflecting optic assembly of claim 1, wherein the one or more light sources comprises a single light source.

17. The reflecting optic assembly of claim 1, wherein the center reflecting surface, the doubly concave first side reflecting surface, and the doubly concave second side reflecting surface are integrally formed as a continuous surface extending across the top of the reflector and the emitted light from the one or more light sources is directly received by and reflected off of each of the center reflecting surface, the doubly concave first side reflecting surface, and the doubly concave second side reflecting surface.

18. The reflecting optic assembly of claim 1, wherein the center reflecting surface, the doubly concave first side reflecting surface, and the doubly concave second side reflecting surface, are situated along the reflector such that the emitted light from the one or more light sources is refocused so as to project from distinct respective virtual focal points.

19. A reflecting optic assembly for use on a vehicle comprising:

a housing having a housing aperture;

a circuit board positioned inside the housing;

a single light source secured to the circuit board and energizable to selectively provide emitted light; and a reflector having a front wall, a rear wall, a first side wall, and a second side wall, where the reflector is mounted in the housing for collecting and distributing the emitted light from the single light source through the housing aperture, the reflector comprising:

a doubly concave first side reflecting surface having a first length and a first width, wherein the doubly concave first side reflecting surface is concave as it extends along both the first length and the first width;

a doubly concave second side reflecting surface having a second length and a second width, wherein the doubly concave second side reflecting surface is concave as it extends along both the second length and the second width; and a transitional center reflecting surface extending between the doubly concave first side reflecting surface and the doubly concave second side reflecting surface, with the center reflecting surface having a third width and a third length, wherein the center reflecting surface is convex as it extends along the third width and concave as it extends along the third length.

20. The reflecting optic assembly of claim 19, wherein the center reflecting surface tapers in width as it extends from the front wall towards the rear wall of the reflector.

* * * * *